US006941046B2

(12) United States Patent
Koike et al.

(10) Patent No.: US 6,941,046 B2
(45) Date of Patent: Sep. 6, 2005

(54) DUAL WAVELENGTH SEMICONDUCTOR LASER SOURCE FOR OPTICAL PICKUP

(75) Inventors: Susumu Koike, Osaka (JP); Kenichi Matsuda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 283 days.

(21) Appl. No.: 10/350,182

(22) Filed: Jan. 24, 2003

(65) Prior Publication Data

US 2003/0142897 A1 Jul. 31, 2003

(30) Foreign Application Priority Data

Jan. 29, 2002 (JP) ....................................... 2002-019685

(51) Int. Cl.[7] ............................. G02B 6/42; H04J 14/02

(52) U.S. Cl. ............................. 385/44; 385/45; 398/82; 398/91

(58) Field of Search ............................... 385/44–45, 79, 385/82; 398/79, 82, 91–92; 372/50

(56) References Cited

U.S. PATENT DOCUMENTS

| | | | | |
|---|---|---|---|---|
| 6,317,554 | B1 | | 11/2001 | Kosaka et al. |
| 6,647,048 | B2 | * | 11/2003 | Evans ......................... 372/50 |
| 6,707,597 | B2 | * | 3/2004 | Hamada ..................... 359/321 |

FOREIGN PATENT DOCUMENTS

| | | |
|---|---|---|
| JP | 02-119286 | 5/1990 |
| JP | 04-245494 | 9/1992 |
| JP | 11-186651 | 7/1999 |
| JP | 11-218627 | 8/1999 |
| JP | P2001-74955 A | 3/2001 |
| JP | 2001-074955 A | 3/2001 |
| JP | 2001-284740 A | 10/2001 |

OTHER PUBLICATIONS

Chutinan et al., "Highly confined waveguide bends in three–dimentional photonic crystal", Applied Physics Letters, vol. 75, No. 24, Dec. 13, 1999, pp. 3739–3741.

* cited by examiner

*Primary Examiner*—Akm Enayet Ullah
*Assistant Examiner*—Jerry T Rahll
(74) *Attorney, Agent, or Firm*—McDermott Will & Emery LLP

(57) ABSTRACT

The dual wavelength semiconductor laser source for an optical pickup includes: two semiconductor laser elements outputting laser beams having oscillating wavelengths different from each other; and a multiplexing waveguide, formed inside of a photonic crystal having a photonic band gap, having one output end outputting laser light at one end surface and two input ends at the other end surfaces. Output beams of the two semiconductor laser elements are coupled to the respective two input ends of the multiplexing waveguide and the two beams are outputted from the one output end of the multiplexing waveguide.

9 Claims, 8 Drawing Sheets

DUAL WAVELENGTH SEMICONDUCTOR LASER SOURCE FOR OPTICAL PICKUP

BACKGROUND OF THE INVENTION

The invention relates to a dual wavelength semiconductor laser source for an optical pickup having a multiplexing waveguide formed in a photonic crystal.

Since a recording density of information (data) recorded on a digital video disk (DVD) is comparatively high, an AlGaInP-based semiconductor laser element having an emission wavelength in a 600 nm band, for example, of 650 nm is used as a laser source to reproduce the information.

An optical pickup used in a prior art DVD device, however, was unable to reproduce data recorded on a compact disk (CD) and a minidisk (MD) using an AlGaAs-based semiconductor laser element having an emission wavelength in a 700 nm band, for example, of 780 nm.

Therefore, as an optical pickup light source capable of reproducing both of DVD and CD or MD, there has been used a dual wavelength semiconductor laser source including an AlGaInP-based semiconductor laser element having an emission wavelength in a 600 nm band and an AlGaAs-based semiconductor laser element having an emission wavelength in a 700 mm band.

In this case, an AlGaInP-based semiconductor laser element and an AlGaAs-based semiconductor laser element are incorporated in one package and an optical pickup integrated into one piece as a dual wavelength semiconductor laser source inevitably becomes larger in size. As a result, since a DVD device itself becomes larger in size, a problem arises that down-sizing is disabled.

Therefore, in order to make an optical pickup smaller in size, an optical pickup having a dual wavelength semiconductor laser element has been known, as disclosed in Laid Open Japanese Patent Application Publication No.11-186651, in which, for example, an AlGaInP-based semiconductor laser element having an emission wavelength in a 600 nm band and an AlGaAs-based semiconductor laser element having an emission wavelength in a 700 nm band are separately formed and monolithically integrated on a single semiconductor substrate made of GaAs to obtain the dual wavelength semiconductor laser element.

As disclosed in the above publication, even with a down-sized integrated dual wavelength semiconductor laser element adopted, a necessity arises for additional usage of other optical parts together with the semiconductor laser elements in order to realize a small size and low cost in an optical pickup. As a result, even in a down-sized integrated dual wavelength semiconductor laser element, a problem occurs that complexity is encountered in an optical system design and reduction in utilization of output light is entailed since light emitting points of two lasers are spaced apart from each other.

In order to realize a dual wavelength semiconductor laser source with a single light emitting point, though an optical waveguide formed in a compound semiconductor substrate is used to multiplex beams having two wavelengths, for example with a Y-shaped waveguide to thereby enable a single light emitting point to be formed, a multiplexing waveguide becomes much larger in size as compared with semiconductor laser elements when a light loss caused by the multiplexing waveguide is intended to be smaller with common type optical waveguides.

For example, reduction in optical loss using a Y-shaped multiplexing waveguide would require an intersecting angle of two input waveguides of 3 degrees or less and in addition, the total length of the Y-shaped multiplexing waveguide would amount to 2 mm or more with a spacing between two light emitting points of 100 μm of an integrated dual wavelength semiconductor laser element. This value is problematic in being not suitable for down-sizing of an optical pickup since it is very large as compared with a size of an integrated dual wavelength semiconductor laser element only having a length and width of the order of 300 μm each.

SUMMARY OF THE INVENTION

The present invention has been made to solve the prior art problems and it is an object of the present invention to realize down-sizing of an optical pickup with a single light emitting point in a semiconductor laser source including a dual wavelength semiconductor laser element.

A trial has been in recent years conducted that forms an optical waveguide in photonic crystal by artificially introducing a linear array of defects into the photonic crystal (for example, an article entitled "Highly confined waveguides and waveguide bends in three-dimensional photonic crystal, appeared in APPLIED PHYSICS LETTERS, Vol. 75, pp. 3739–3741, December 1999).

Photonic crystal has features that it is a crystal having therein a periodical refractive index distribution and has a band structure formed with respect to photon energy in a way corresponding to a band structure formed with respect to electron energy in a solid state crystal. A photonic band gap is formed in a perfect photonic crystal and no photon can take an energy state within the photonic band gap, that is to say, no existence of light having a wavelength in a wavelength band corresponding to the photonic band gap is allowed within a photonic crystal.

A linear array of defects in the shape of a straight line can be artificially incorporated into a photonic crystal to thereby form a waveguide and the waveguide formed in the photonic crystal has a very distinguishing character that no light in the waveguide is leaked out outside thereof because of the presence of a photonic band gap outside thereof.

A photonic crystal, as shown in FIG. 1, has a stacked-bar structure in which layers in which strips (columnar bodies) 10 made of GaAs, for example, are arranged periodically in position in each of the planes are stacked so that sets of strips 10 in an upper layer and a lower layer, respectively, adjacent to each other are perpendicular to each other in a lattice.

The inventors of the present application have conducted various studies to thereby obtain findings and knowledge that by properly selecting a width and a structure period of the strips 10 in arrangement, a photonic crystal can be formed that has a photonic band gap in a wavelength band of from 600 nm to 1000 nm, that is to say, an optical waveguide coinciding with two wavelength bands (a 600 nm band and a 700 nm band) used as a light source of an optical pickup for use in DVD and CD or MD can be formed in a photonic crystal.

Further findings and knowledge have been obtained that when plural optical waveguides formed in a photonic crystal are combined to form a wavelength multiplexing element, light can be efficiently propagated from a waveguide to a waveguide, even perpendicular to each other, thereby enabling a wavelength multiplexing element in a small size with a very high light utilization efficiency to be realized.

The present invention has been made based on the findings and knowledge with a feature that output beams from two light emitting points of a dual wavelength semiconductor laser element are optically coupled in a wavelength multiplexing element formed in a photonic crystal to emit output beams having two wavelengths from a single light emitting point.

To be concrete, a dual wavelength semiconductor laser source for an optical pickup relating to the present invention includes: two semiconductor laser elements outputting laser beams having oscillating wavelengths different from each other; and a multiplexing waveguide, formed inside of a photonic crystal having a photonic band gap, having one output end outputting laser light at one end surface and two input ends at the other end surfaces, wherein output beams of the two semiconductor laser elements are coupled to the respective two input ends of the multiplexing waveguide and the two beams are outputted from the one output end of the multiplexing waveguide.

A dual wavelength semiconductor laser source for an optical pickup of the present invention enables down-sizing of the optical pickup with a single light emitting point of the semiconductor laser source including a dual wavelength semiconductor laser element.

In a dual wavelength semiconductor laser source for an optical pickup of the present invention, two semiconductor laser elements are preferably formed being spaced apart from each other on a single semiconductor substrate.

In a dual wavelength semiconductor laser source for an optical pickup of the present invention, oscillating wavelengths of respective two semiconductor laser elements preferably fall within a wavelength band corresponding to a photonic band gap of a photonic crystal.

In a dual wavelength semiconductor laser source for an optical pickup of the present invention, it is preferable that a photonic crystal is of a stacked-bar structure in which plural strips made of semiconductor or dielectric are stacked in a lattice and a multiplexing waveguide is constituted of plural waveguides created by removing part of plural strips along them.

Furthermore, in a dual wavelength semiconductor laser source for an optical pickup of the present invention, it is preferable that a photonic crystal is of a structure in which thin films, each made of a resin material, and having plural hole portions arranged two-dimensionally thereon are layered and a multiplexing waveguide is constituted of plural waveguides, each made of a region in the shape of a strip with none of the hole portions formed therein.

In any of the above cases, it is preferable that a multiplexing waveguide includes first and second waveguides formed in respective layered planes different from each other in a photonic crystal, the second waveguide has a bend portion in the shape of an in-plane L letter and one end portion of the first waveguide is formed in the proximity of the bend portion of the second waveguide.

A semiconductor laser source for an optical pickup relating to the present invention includes: plural semiconductor laser elements; and a multiplexing waveguide, formed inside of a photonic crystal having a photonic band gap, and having one output end outputting laser light at one end surface and plural input ends at the other end surfaces, wherein output beams of the plural semiconductor laser elements are coupled to respective plural input ends of the multiplexing waveguide to output output beams from the one output end of the multiplexing waveguide in a multiplexed state.

In a semiconductor laser source for an optical pickup of the present invention, oscillating wavelengths of output beams of plural semiconductor laser elements are preferably the same as each other.

With such aspects of present invention adopted, a high power semiconductor laser source can be realized.

DETAILED DESCRIPTION OF THE INVENTION

Embodiment 1

Description will be given of a first embodiment of the present invention with reference to the accompanying drawings.

At first, covered in the description are a photonic crystal having a photonic band gap for use in a dual wavelength semiconductor laser source for an optical pickup of the present invention and a construction and a function of a multiplexing waveguide formed inside of the photonic crystal.

Figure 1:
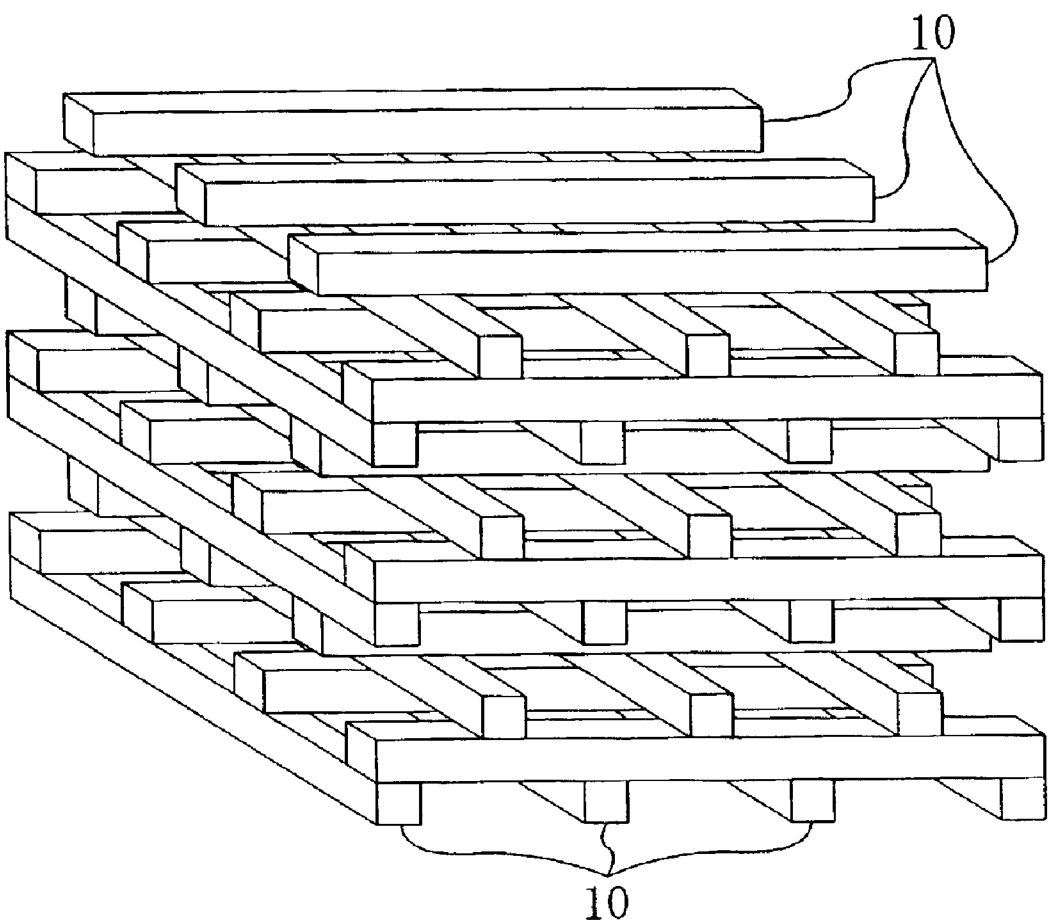
FIG. 1 is a perspective view showing a photonic crystal for use in a dual wavelength semiconductor laser source for an optical pickup of the present invention.
Figure 2:
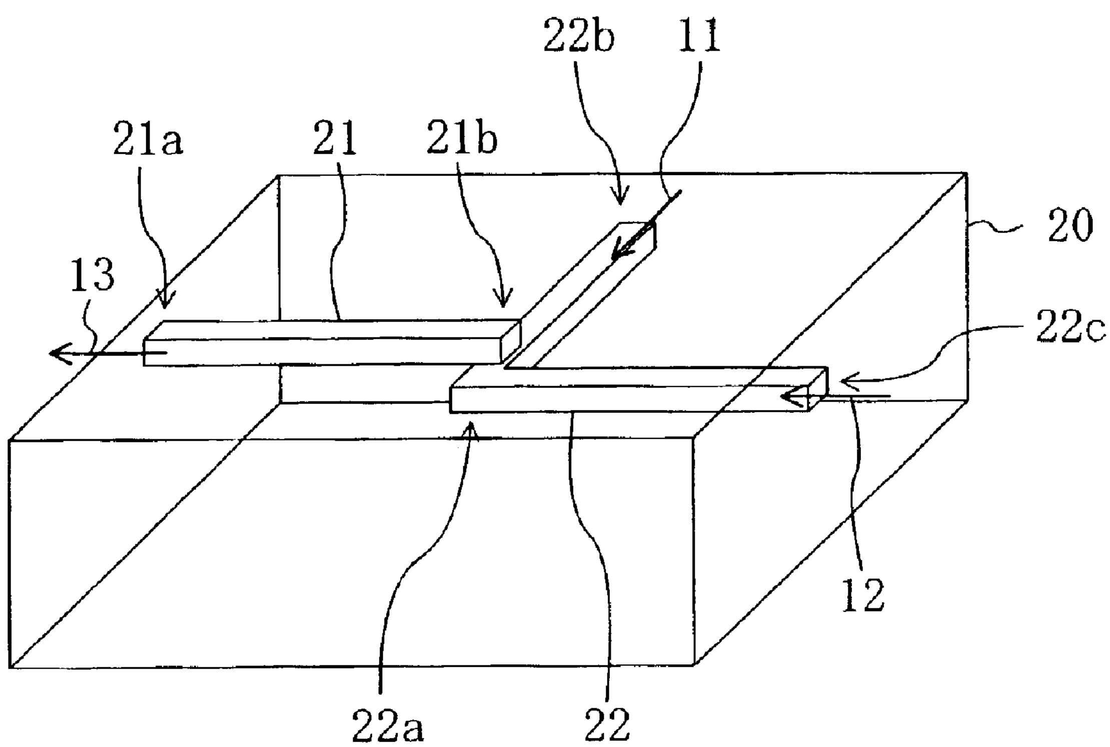
FIG. 2 is a schematic perspective view for describing a fundamental construction of a wavelength multiplexing element made of a photonic crystal for use in a dual wavelength semiconductor laser source for an optical pickup of the present invention.

FIG. 2 schematically shows a fundamental construction of a photonic crystal and a wavelength multiplexing element including a multiplexing waveguide formed inside thereof, relating to the present invention. Herein, a detailed structure of the photonic crystal constituting a wavelength multiplexing element is omitted only with an outward shape of the wavelength multiplexing element and an arrangement of a wavelength waveguide shown.

As shown in FIG. 2, a first waveguide 21 and a second waveguide 22, wave-guiding light having wavelengths in a wavelength band corresponding to a photonic band gap with respect to a photon are formed in a wavelength multiplexing element 20, having the outward shape of a rectangular prism, and made of a photonic crystal having the photonic band gap with respect to a photon.

The first waveguide 21 extending in a straight line has an output end 21*a* being open at one side surface of the wavelength multiplexing element 20 and an internal input end 21*b* located in the central portion of the wavelength multiplexing element 20.

The second waveguide 22 has a bend portion 22*a* in the shape of an in-plane L letter located below the internal input end 21*b* of the first waveguide 21. That is to say, the first waveguide 21 and the second waveguide 22 are not in the same plane, but the second waveguide 22 is formed in a plane spaced apart from the first waveguide 21 by almost one-fourths of one period in a structure period of the photonic crystal. Furthermore, the second waveguide 22 has a first input end 22*b* on a side surface adjacent to the output end 21*a* of the wavelength multiplexing element 20 and a second input end 22*c* on a side surface opposite to the output end 21*a* of the wavelength multiplexing element 20.

That is to say, an in-plane T waveguide is constructed of: the first waveguide 21 in the shape of a straight line formed in one plane; and a the second waveguide 22 in the shape of an in-plane L letter formed in another plane, combined.

Herein, in the second waveguide 22 in the shape of an in-plane L letter formed in the wavelength multiplexing element 20, first incident light 11 impinged on the first input end 22*b* is not propagated into the second input end 22*c* and a second incident light 12 impinged on the second input end 22*c* is not propagated into the first input end 22*b*.

On the other hand, the first waveguide 21 in the shape of a straight line formed in a plane different from the second waveguide 22 allows any of the input light 11 and 12 impinged on the respective input ends 22*b* and 22*c* of the second waveguide 22 to transit to the first waveguide 21 at a high efficiency and to thereby output it from the output end 21*a*.

Therefore, by inputting emission beams emitted from semiconductor laser elements into the respective input ends 22*b* and 22*c* of the second waveguide 22 in the shape of an in-plane L letter to output emission light outputted from the output end 21*a* of the first waveguide 21 in the shape of a straight line and use it as output light of an optical pickup, a wavelength multiplexing element with an extremely high efficiency can be obtained with no light coupling occurring between the first and second input ends 22*b* and 22*c*.

Description will be given of a dual wavelength semiconductor laser source to which the wavelength multiplexing element 20 shown in FIG. 2 is applied.

Figure 3:
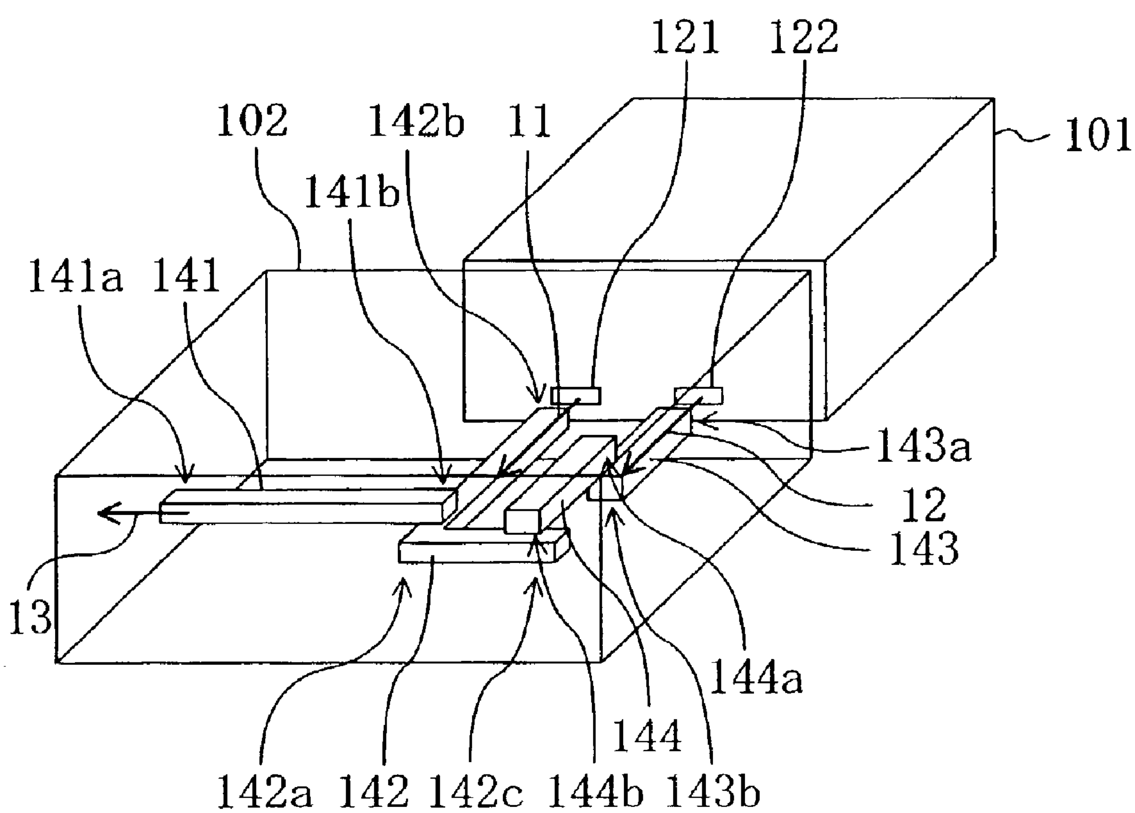
FIG. 3 is a schematic perspective view showing a dual wavelength semiconductor laser source for an optical pickup relating to a first embodiment of the present invention.

FIG. 3 shows a dual wavelength semiconductor laser source for an optical pickup, as a diagram, relating to the first embodiment of the present invention.

A dual wavelength semiconductor laser source relating to the first embodiment, as shown in FIG. 3, includes: a dual wavelength semiconductor laser device 101 formed by integrating two semiconductor laser elements emitting respective laser beams with oscillating wavelengths different from each other on a single substrate; and a wavelength multiplexing element 102 having plural waveguides waveguiding emission light having wavelengths falling in a wavelength band corresponding to a photonic band gap inside of a photonic crystal having a photonic band gap.

The dual wavelength semiconductor laser device 101 exposes emission end surfaces of first and second active layers 121 and 122, each of which has a multiple quantum well structure formed in parallel to each other at a side surface facing one side surface of the wavelength multiplexing element 102 in the shape of a rectangular prism. The first emission light 11 having a wavelength of 780 nm is emitted from the first active layer 121 and a second emission light 12 having a wavelength of 650 nm is emitted from the second active layer 122.

The input ends 22*b* and 22*c* of the wavelength multiplexing element 20 shown in FIG. 2 are installed on respective side surfaces adjacent to each other, while the wavelength multiplexing element 102 relating to the first embodiment is constructed of 4 waveguides combined so as to enable two emission beams 11 and 12 emitted from the dual wavelength semiconductor laser device 101 in parallel to each other to be received on a single side surface.

To be concrete, as shown in FIG. 3, a first waveguide 141 extending in a straight line has an output end 141*a* being open at one side surface of the wavelength multiplexing element 102 in parallel to an emission direction of the emission beams 11 and 12; and an internal input end 141*b* located in the central portion of the wavelength element 102.

A second waveguide 142 has a bend portion 142*a* in the shape of an in-plane L letter located below the internal input end 141*b* of the first waveguide 141. Herein, the first waveguide 141 and the second waveguide 142 are not in the same plane and the second waveguide 142 is formed in a plane spaced apart from the first waveguide 141 in the shape of a straight line by almost one-fourths of one period in a structure period of the photonic crystal. Furthermore, a first input end 142*b* at one end portion of the second waveguide 142 is formed at a position on a side surface of the wavelength multiplexing element 102 facing the first active layer 121 of the dual wavelength semiconductor laser device 101, while an internal input end 142*c* as the other end portion of the second waveguide 142 is formed at a position at which the second waveguide 142 intersects with the second emission beam 12 of the dual wavelength semiconductor laser device 101.

In a third waveguide 143, a second input end 143*a* is formed at a position, adjacent to the first input end 142*b*, and facing the second active layer 122 and an internal output end 143*b* is formed at a position in a spacing between the second input end 143*a* and the internal input end 142*c* of the second wave guide 142.

In a fourth waveguide 144, an internal input end 144*a* is formed above the internal output end 143*b* of the third waveguide 143 and an internal output end 144*b* is formed above the internal input end 142*c* of the second waveguide 142.

Therefore, the first waveguide 141 and the fourth waveguide 144 are formed in one plane and the second waveguide 142 and the third wave guide 143 are formed in another plane below and adjacent to the one plane. Note that contrary to this, a plane in which the first waveguide 141 and the fourth waveguide 144 are formed may be below a plane in which the second waveguide 142 and the third waveguide 143 are formed.

With such a construction adopted, the first emission beam 11 emitted from the first active layer 121 of the dual wavelength semiconductor laser device 101 is optically coupled to the first input end 142*b*, transits to the internal input end 141*b* of the first waveguide 141 at the bend portion 142*a* of the second waveguide 142 and emitted from the output end 141*a* as output light 13.

Similarly, the second emission beam 12 emitted from the second active layer 122 of the dual wavelength semiconductor laser device 101 is optically coupled to the second input end 143*a*, passes through the third waveguide 143, through the fourth waveguide 144 and through the internal output end 144*b* thereof, and optically coupled to the internal input end 142*c* of the second waveguide 142. Furthermore, the second emission beam 12 transits to the internal input end 141*b* of the first waveguide 141 at the bend portion 142*a* of the second waveguide 142 and emitted from the output end 141*a* of the first waveguide 141 as the output light 13.

According to the first embodiment, in such a way, even with the use of a dual wavelength semiconductor laser device 101 obtained by integrating two laser elements having respective emission beams 11 and 12 different in wavelength from each other, the output light 13 can be taken out from the one output end 141*a*, that is to say, a single light emitting point; therefore, an optical design of an optical pickup is facilitated, enabling down-sizing thereof In addition thereto, since the waveguides 141 to 144 of the wavelength multiplexing element 102 are formed inside of a photonic crystal, improvement is realized on utilization efficiencies of emission beams 11 and 12 from the dual wavelength laser device 101; thereby enabling higher performance to be obtained as well.

Note that, while in the first embodiment, the first active layer 121 and the second active layer 122 are at the same height as each other, when the second active layer 122 is formed so as to coincide with the fourth waveguide 144 in height, the second emission beam 12 is coupled directly to the fourth waveguide 144 without a necessity for the third waveguide 143 installed.

Concrete description will be given of a photonic crystal and waveguides constituting the wavelength multiplexing element 102 below with reference to FIG. 4.

Figure 4:
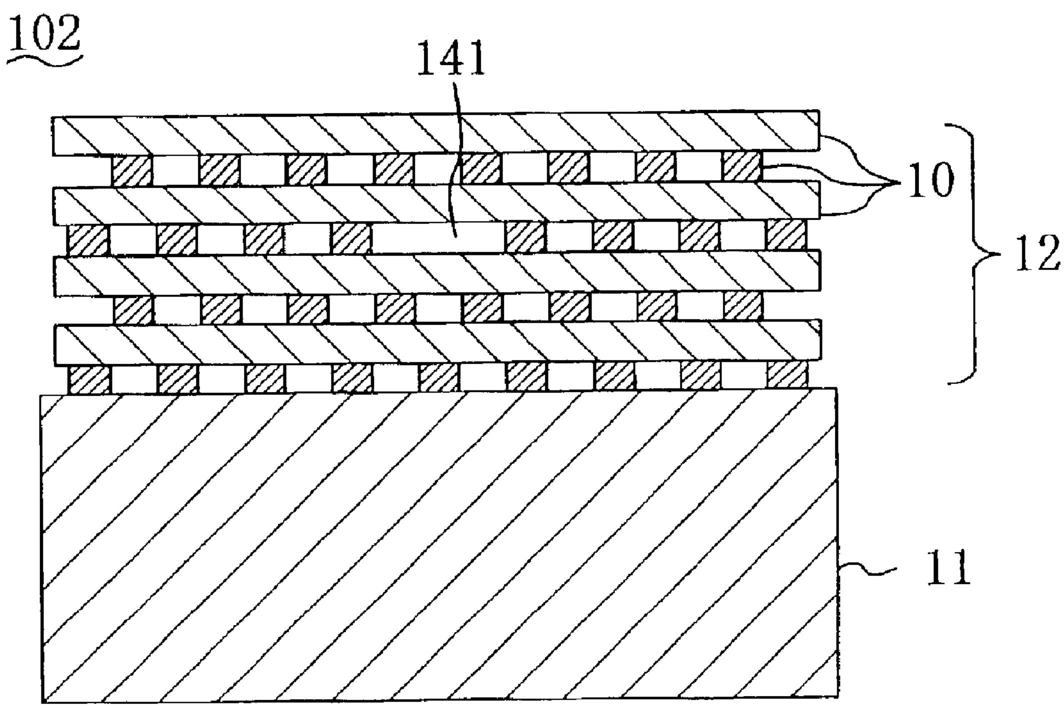
FIG. 4 is a sectional view of a construction of a wavelength multiplexing element for use in a dual wavelength semiconductor laser source for an optical pickup relating to a first embodiment of the present invention.

FIG. 4 shows a sectional construction of the wavelength multiplexing element 102 relating to the first embodiment of the present invention. Plural strips 10 made of GaAs, as shown in FIG. 4, are arranged in parallel with each other in each of layers and furthermore, the layers are stacked on a major surface of a substrate 11 made of gallium arsenide (GaAs), for example, so that plural strips in one layer are positionally perpendicular to those in another adjacent layer in a lattice, whereby a photonic crystal 12 is constructed.

Herein, as one example, with settings that a width of the strip 10 is 100 nm, a thickness (a height) is 120 nm and a structure period of strips in arrangement in a plane is 400 nm, a photonic crystal 12 has a photonic band gap corresponding to a wavelength band from 600 nm to 1000 nm. No existence of light having a wavelength falling within the photonic band gap can be ensured inside of the photonic crystal 12.

Therefore, when a region in the shape of a straight line (a cavity region) where a strip 10 is partly removed is formed in the photonic crystal 12, the region serves as defects in the photonic crystal 12, which defect portion works as the waveguide 141 and others through which light can be propagated.

Note that a material of the strips 10 constituting a photonic crystal is not limited to semiconductor, but there may be used a dielectric material such as silicon dioxide ($SiO_2$), silicon nitride ($Si_3N_4$), aluminum oxide ($Al_2O_3$) or the like.

Furthermore, a material of the substrate 11 is not limited to GaAs, but there may be used semiconductor such as silicon (Si), indium phosphide (InP) or gallium nitride (GaN) and furthermore, dielectric crystal or glass such as sapphire (single crystal $Al_2O_3$), lithium niobium oxide ($LiNiO_3$) or YIG ($Y_3In_5O_{12}$).

One Example Modification Of Embodiment 1

Description will be given of one example modification of the first embodiment of the present invention below with reference to a figure.

Figure 5:
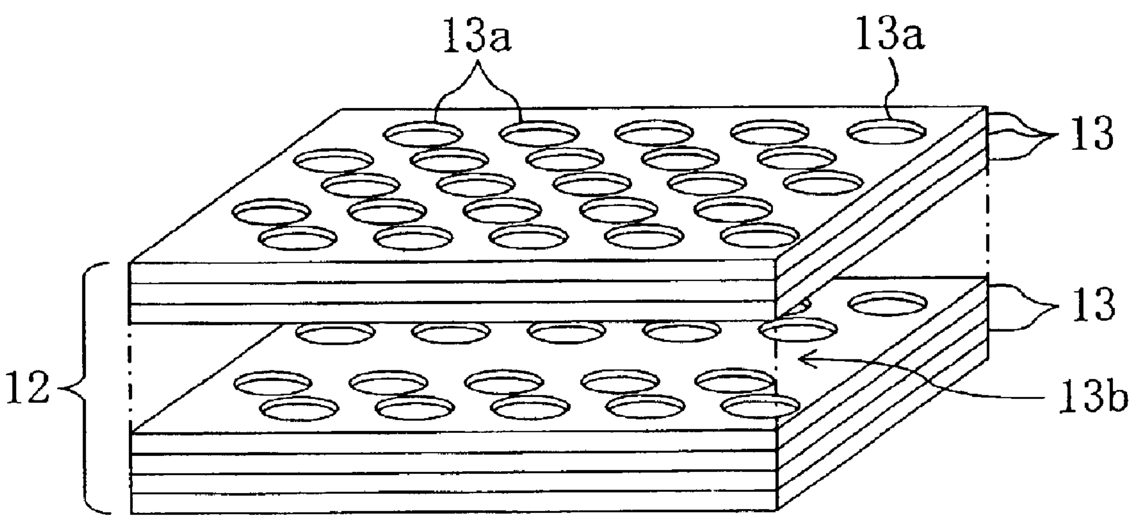
FIG. 5 is a schematic perspective view showing a photonic crystal which constitutes a wavelength multiplexing element relating to one example modification of the first embodiment of the present invention.

FIG. 5 shows the photonic crystal 12 as a diagram which constitutes a wavelength multiplexing element relating to one example modification of the first embodiment.

The photonic crystal 12 relating to this example modification, as shown in FIG. 5, is formed by stacking plural thin films, each made of resin, and each having plural hole portions 13*a* arranged in an array.

A material of the thin film 13 can be acrylic resin, polyimide or fluorocarbon resin. As an example, when acrylic resin thin films are used, each of which has a diameter of a hole portion 13*a* of 300 nm, a structure period in arrangement thereof in a plane of 500 nm and a thickness of 250 nm, a photonic crystal 12 has a photonic band gap corresponding to a wavelength band from 600 nm to 1000 nm. Furthermore, when a strip portion in which none of the hole portions 13*a* is formed in the thin film 13 is formed, the strip portion works as defects in the photonic crystal 12, which defect portion works as a waveguide 13*b* through which light can propagate.

Note that while in the first embodiment and the example modification thereof, the dual wavelength semiconductor laser device 101 monolithically formed is used as a two wavelength light source, even when two semiconductor laser elements individually formed as separate objects are used as a light source, a dual wavelength laser source enabling down-sizing of an optical pickup can be realized because of the single light emitting point if the wavelength multiplexing element 102 relating to the embodiment is used.

Embodiment 2

Description will be given of a second embodiment of the present invention below with reference to a figure.

Figure 6:
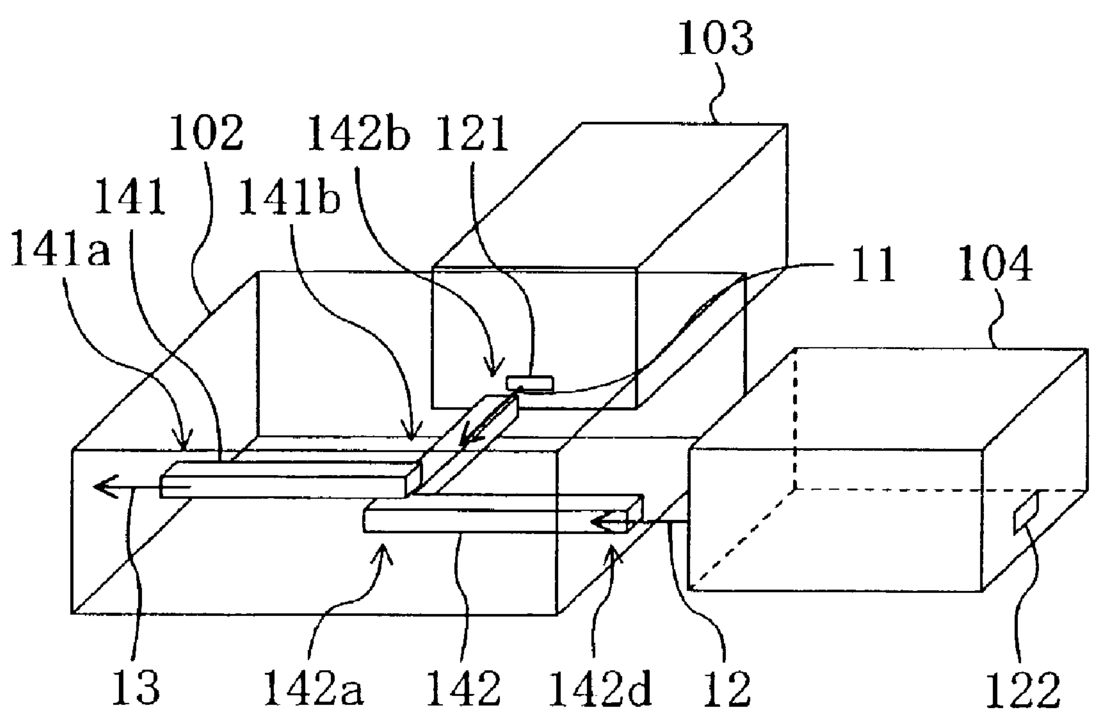
FIG. 6 is a schematic perspective view showing a dual wavelength semiconductor laser source for an optical pickup relating to a second embodiment of the present invention.

FIG. 6 shows a dual wavelength semiconductor laser source for an optical pickup, as a diagram, relating to the second embodiment of the present invention. In FIG. 6, the same constituent members as the corresponding constituents shown in FIG. 3 are attached by the same symbols and each of descriptions thereof is omitted.

In the second embodiment, as shown in FIG. 6, a construction is adopted in which a first semiconductor laser element 103 and a second semiconductor laser element 104 having an oscillating wavelength different from an oscillating wavelength of the first semiconductor laser element 103 are provided as separate objects.

A wavelength multiplexing element 102 relating to the second embodiment is of a construction equivalent to that of the wavelength multiplexing element 20 shown in FIG. 2 and includes: a first waveguide 141 in the shape of a straight line; and a second waveguide 142 in the shape of an in-plane L letter. Therefore, a second input end 142*d* of the second waveguide 142 is formed on a side surface opposite to an output end 141*a* of the first waveguide 141.

A first emission beam 11 emitted from a first semiconductor laser element 103 is optically coupled to an internal end 142*b* of the second waveguide 142 and a second emission beam 12 emitted from a second laser element 104 is optically coupled to a second internal input end 142*d* of the second waveguide 142. Herein, the first semiconductor laser element 103 is given as an AlGaAs-based infrared semiconductor laser element with a first active layer 121 having an emission wavelength of, for example, 780 nm and the second semiconductor laser element 104 is given as an AlGaInP-based red semiconductor laser element with a second active layer 122 having an emission wavelength of, for example, 650 nm.

With such a construction, since a dual wavelength light source for an optical pickup is realized in which light emitting points of two laser beams having respective wavelengths different from each other coincide with each other, an optical design is facilitated, thereby enabling realization of a small optical pickup adaptable to optical disks of both types of CD and DVD.

One Example Modification Of Embodiment 2

Description will be given of one example modification of the second embodiment of the present invention below with reference to a figure.

Figure 7:
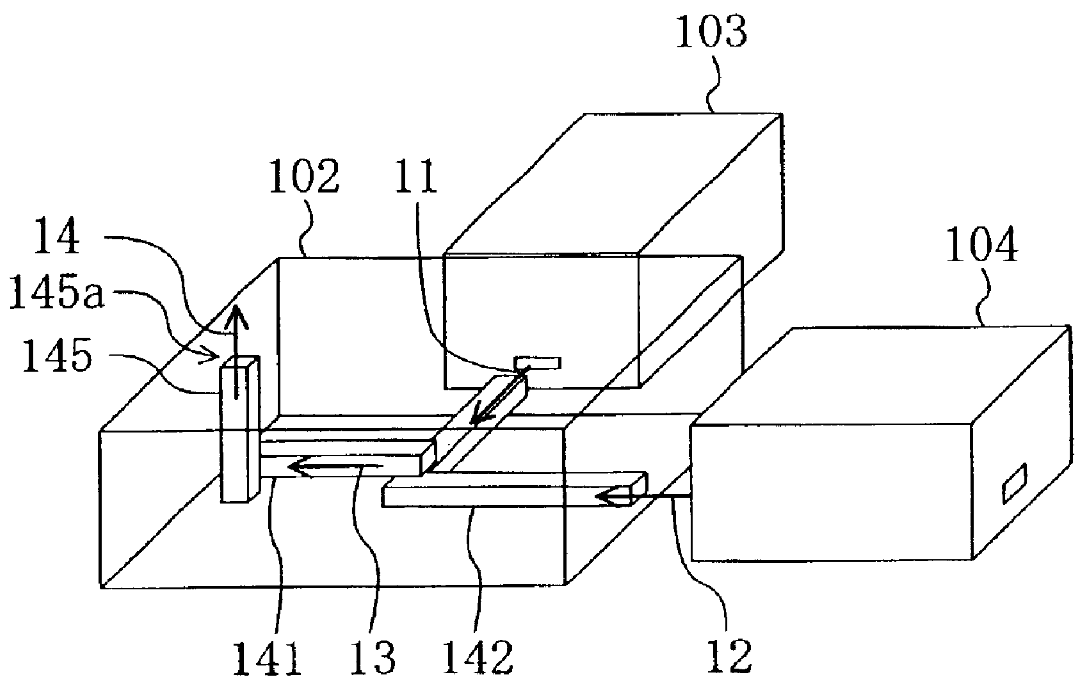
FIG. 7 is a schematic perspective view showing a dual wavelength semiconductor laser source for an optical pickup relating to one example modification of the second embodiment of the present invention.

FIG. 7 shows a dual wavelength semiconductor laser source for an optical pickup, as a diagram, relating to the one example modification of the second embodiment.

This example modification is given as a construction in which the output end of the first waveguide 141 remains inside of a photonic crystal instead of providing the output end of the first waveguide 141 on a side surface. There is further provided a third waveguide 145 having one end in the proximity of an output end portion of the first waveguide 141 and the other end portion thereof located at the top surface as an output end 145*a*.

With such a construction, output light 14 outputted from the wavelength multiplexing element 102 can be taken out in a direction perpendicular to a plane in which there are arranged the wavelength multiplexing element 102 and the semiconductor laser elements 103 and 104. As a result, no necessity arises for a rise mirror to alter a direction of the output beams from the semiconductor laser elements 103 and 104 by 90 degrees, whose necessity commonly would otherwise arises in constructing an optical pickup.

Note that the construction of this example modification can also be applied to each of the wavelength multiplexing elements relating to the first embodiment and the example modification thereof.

Embodiment 3

Description will be given of a third embodiment of the present invention below with reference to a figure.

Figure 8:
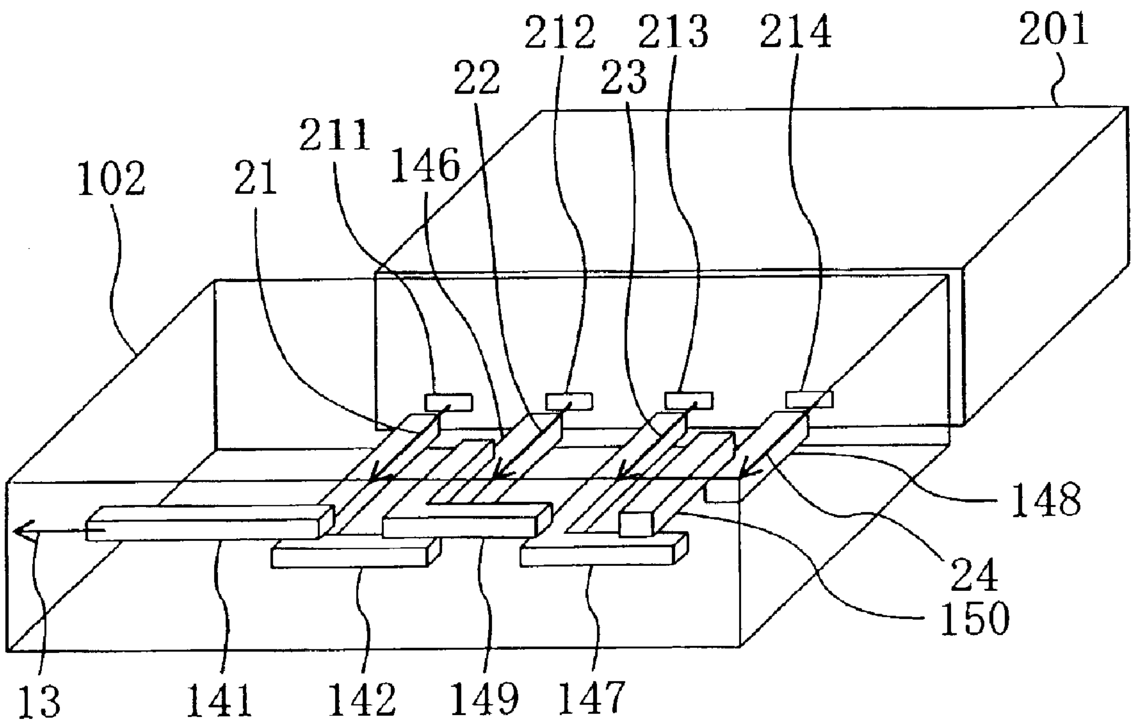
FIG. 8 is a schematic perspective view showing a semiconductor laser source for an optical pickup relating to a third embodiment of the present invention.

FIG. 8 shows a semiconductor laser source for an optical pickup, as a diagram, relating to the third embodiment of the present invention.

A high power semiconductor laser source relating to the third embodiment, as shown in FIG. 8, includes: a semiconductor laser array 201 in which a first active layer 211, a second active layer 212, a third active layer 213 and a fourth active layer 214 are integrated with each other, which emit a first emission beam 21, a second emission beam 22, a third emission beam 23 and a fourth emission beam 24, respectively.

A wavelength multiplexing element 102 includes: a first waveguide 141 in the shape of a straight line; a second waveguide 142 in the shape of an in-plane L letter on which the first emission beam 21 is impinged; in addition thereto, a third wavelength 146 in the shape of a straight line on which the second emission beam 22 is impinged; a fourth waveguide 147 in the shape of an in-plane L letter on which the third emission beam 23 is impinged; and a fifth waveguide 148 in the shape of a straight line on which the fourth emission beam 24 is impinged so that the emission beams 21 to 24 are wavelength-multiplexed into one output light 14.

Furthermore, the wavelength multiplexing element 102 further includes: a sixth waveguide 149 in the shape of an in-plane L letter optically coupling the third waveguide 146 and the fourth waveguide 147; a seventh waveguide 150 in the shape of a straight line optically coupling the fifth waveguide 148 and the fourth waveguide 147, both being formed in the same plane as the first waveguide 141.

The third embodiment may be applied to multi-wavelength laser array having 4 kinds of oscillating wavelengths and furthermore, can be applied to a semiconductor laser array having the same and one oscillating wavelength. In this case, a high power semiconductor laser source can be realized with ease.

Note that while a construction has been shown in which the 4 active layers 211 to 214 are provided in the semiconductor laser array 201, no specific limitation is placed to the 4 active layers in the semiconductor laser array 201 but needless to say that the third embodiment can be applied to a case of an increased number of active layers.

Furthermore, the present invention is not limited to the first to third embodiments and the example modifications thereof, but various modification thereof can be implemented based on the technical concept of the present invention. For example, the wavelength multiplexing elements 102 made of a photonic crystal having been described in the respective embodiments can be each constructed by a combination of plural waveguides when required.

What is claimed is:

1. A dual wavelength semiconductor laser source for an optical pickup comprising:

two semiconductor laser elements outputting laser beams having oscillating wavelengths different from each other; and a multiplexing waveguide, formed inside of a photonic crystal having a photonic band gap, having one output end outputting laser light at one end surface and two input ends at the other end surfaces, wherein output beams of said two semiconductor laser elements are coupled to said respective two input ends of said multiplexing waveguide and said two beams are outputted from said one output end of said multiplexing waveguide.

2. The laser source of claim 1, wherein said two semiconductor laser elements are formed being spaced apart from each other on a single semiconductor substrate.

3. The laser source of claim 1, wherein oscillating wavelengths of said respective two semiconductor laser elements fall within a wavelength band corresponding to the photonic band gap of said photonic crystal.

4. The laser source of claim 1, wherein said photonic crystal is of a stacked-bar structure in which plural strips made of semiconductor or dielectric are stacked in a lattice and said multiplexing waveguide is constituted of plural waveguides created by removing part of said plural strips along them.

5. The laser source of claim 4, wherein said multiplexing waveguide includes first and second waveguides formed in respective layered planes different from each other in said photonic crystal, said second waveguide has a bend portion in the shape of an in-plane L letter and one end portion of said first waveguide is formed in the proximity of said bend portion of said second waveguide.

6. The laser source of claim 1, wherein said photonic crystal is of a structure in which thin films, each made of a resin material, and having plural hole portions arranged two-dimensionally thereon are layered and said multiplexing waveguide is constituted of plural waveguides each made of a region in the shape of a strip with none of said hole portions formed therein.

7. The laser source of claim 6, wherein said multiplexing waveguide includes first and second waveguides formed in respective layered planes different from each other in said photonic crystal, said second waveguide has a bend portion in the shape of an in-plane L letter and one end portion of said first waveguide is formed in the proximity of said bend portion of said second waveguide.

8. A semiconductor laser source for an optical pickup comprising:

plural semiconductor laser elements; and a multiplexing waveguide, formed inside of a photonic crystal having a photonic band gap, and having one output end outputting laser light at one end surface and plural input ends at the other end surfaces, wherein output beams of said plural semiconductor laser elements are coupled to respective plural input ends of said multiplexing waveguide to output output beams from said one output end of said multiplexing waveguide in a multiplexed state.

9. The laser source of claim 8, wherein oscillating wavelengths of output beams of said plural semiconductor laser elements are the same as each other.

* * * * *